United States Patent
Lu et al.

(10) Patent No.: US 9,778,731 B2
(45) Date of Patent: Oct. 3, 2017

(54) METHOD FOR PERFORMING SYSTEM POWER BUDGETING WITHIN ELECTRONIC DEVICE, AND ASSOCIATED APPARATUS

(71) Applicant: MEDIATEK INC., Hsin-Chu (TW)

(72) Inventors: Chia-Lin Lu, Kaohsiung (TW); Hui-Hsuan Wang, Taoyuan (TW); I-Pu Niu, Taichung (TW); Yu-Chung Chang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/787,767

(22) PCT Filed: Mar. 27, 2015

(86) PCT No.: PCT/CN2015/075220
§ 371 (c)(1),
(2) Date: Oct. 29, 2015

(87) PCT Pub. No.: WO2015/144086
PCT Pub. Date: Oct. 1, 2015

(65) Prior Publication Data
US 2016/0062439 A1 Mar. 3, 2016

Related U.S. Application Data

(60) Provisional application No. 61/971,896, filed on Mar. 28, 2014.

(51) Int. Cl.
*G05B 15/02* (2006.01)
*H04W 4/00* (2009.01)
(Continued)

(52) U.S. Cl.
CPC ............... *G06F 1/329* (2013.01); *G06F 1/10* (2013.01); *G06F 1/3206* (2013.01);
(Continued)

(58) Field of Classification Search
CPC .......... G06F 1/10; G06F 1/206; G06F 1/3206; G06F 1/3212; G06F 1/3228; G06F 1/324; G06F 1/329; G06F 1/3296
See application file for complete search history.

(56) References Cited

U.S. PATENT DOCUMENTS

| | | | |
|---|---|---|---|
| 7,174,469 B2 | 2/2007 | Luick | |
| 2006/0156042 A1* | 7/2006 | Desai | G06F 1/28 713/300 |

(Continued)

FOREIGN PATENT DOCUMENTS

| CN | 101227672 A | 7/2008 |
|---|---|---|
| CN | 102096460 A | 6/2011 |

(Continued)

OTHER PUBLICATIONS

"International Search Report" mailed on Jun. 23, 2015 for International application No. PCT/CN2015/075220, International filing date:Mar. 27, 2015.

(Continued)

*Primary Examiner* — Thomas Lee
*Assistant Examiner* — Chad Erdman
(74) *Attorney, Agent, or Firm* — Winston Hsu

(57) ABSTRACT

A method for performing system power budgeting within an electronic device and an associated apparatus are provided. The method includes the steps of: utilizing a power consumption index generator positioned in a specific subsystem to generate a power consumption index corresponding to the specific subsystem, where the electronic device includes a plurality of subsystems, and the specific subsystem is one of the plurality of subsystems; and performing configuration adjustment on at least one portion of the electronic device according to the power consumption index corresponding to the specific subsystem.

13 Claims, 6 Drawing Sheets

(51) Int. Cl.
  *G06F 1/32* (2006.01)
  *G06F 1/10* (2006.01)
  *G06F 1/20* (2006.01)

(52) U.S. Cl.
  CPC ............ *G06F 1/3228* (2013.01); *G06F 1/206* (2013.01); *G06F 1/324* (2013.01); *G06F 1/3212* (2013.01); *G06F 1/3296* (2013.01); *Y02B 60/1217* (2013.01); *Y02B 60/1275* (2013.01); *Y02B 60/1292* (2013.01)

(56) References Cited

U.S. PATENT DOCUMENTS

| | | | |
|---|---|---|---|
| 2006/0282685 A1 | 12/2006 | Bahali | |
| 2007/0049133 A1* | 3/2007 | Conroy | G06F 1/26 439/894 |
| 2007/0124094 A1 | 5/2007 | Brey | |
| 2008/0244311 A1* | 10/2008 | Elliott | G06F 1/28 714/22 |
| 2009/0125293 A1* | 5/2009 | Lefurgy | G06F 11/3447 703/18 |
| 2011/0053656 A1* | 3/2011 | Plestid | H01M 10/42 455/574 |
| 2012/0005513 A1 | 1/2012 | Brock | |
| 2013/0046997 A1* | 2/2013 | Callaway | H02J 3/14 713/300 |
| 2013/0155073 A1 | 6/2013 | Khodorkovsky | |
| 2013/0159755 A1 | 6/2013 | Presant | |
| 2013/0219203 A1* | 8/2013 | Fujisaki | G06F 1/3206 713/323 |
| 2013/0227261 A1 | 8/2013 | Anderson | |
| 2013/0311803 A1* | 11/2013 | Wang | G06F 1/3212 713/320 |
| 2014/0006818 A1 | 1/2014 | Doshi | |
| 2014/0089688 A1 | 3/2014 | Man | |
| 2015/0227397 A1* | 8/2015 | Gogula | G06F 9/5094 718/104 |

FOREIGN PATENT DOCUMENTS

| | | |
|---|---|---|
| CN | 103220435 A | 7/2013 |
| EP | 2 658 231 A1 | 10/2013 |

OTHER PUBLICATIONS

"International Search Report" mailed on Jul. 3, 2015 for International application No. PCT/CN2015/075211, International filing date: Mar. 27, 2015.

* cited by examiner

METHOD FOR PERFORMING SYSTEM POWER BUDGETING WITHIN ELECTRONIC DEVICE, AND ASSOCIATED APPARATUS

CROSS REFERENCE TO RELATED APPLICATIONS

This application claims the benefit of U.S. Provisional Application No. 61/971,896, which was filed on Mar. 28, 2014, and is included herein by reference.

BACKGROUND

The present invention relates to power consumption control of a system comprising multiple subsystems, and more particularly, to a method for performing system power budgeting within an electronic device, and an associated apparatus.

A conventional portable electronic device may suffer from the thermal issue caused by high power consumption. More particularly, the thermal issue in a conventional system on chip (SoC) architecture for implementing the conventional portable electronic device is getting worse as both of the chip area and the operational frequency of the conventional SoC architecture increase. For example, the conventional portable electronic device may be a conventional smartphone or a conventional wearable device, and a conventional thermal control mechanism may be applied when the device temperature is unacceptable to the user.

According to the related art, some conventional methods are proposed in order to solve the above problem. For example, one of the conventional methods may comprise detecting the current temperature of the conventional portable electronic device and, based on the current temperature, passively and coarsely regulating the chip voltage or frequency to lower the chip temperature. Another of the conventional methods may comprise, based on the temperature-rising slope, actively regulating the chip voltage or frequency to lower the chip temperature. However, further problems such as some side effects may be introduced. For example, bad power-efficiency is typical. In addition, coarse-grained regulation may cause excessive system performance degradation. Additionally, as the temperature slope may be regarded as a combinative heat dissipation result from all the components on the chip, the package, and the ambience, the granularity is too coarse to identify the most contributive factors on the whole system, which may restrain it from further control, such as proactive battery resource allocation. Thus, a novel architecture is required, for enhancing the thermal control with fewer side effects.

SUMMARY

It is therefore an objective of the claimed invention to provide a method for performing system power budgeting within an electronic device, and an associated apparatus, in order to solve the above-mentioned problems.

It is another objective of the claimed invention to provide a method for performing system power budgeting within an electronic device, and an associated apparatus, in order to achieve the goal of enhanced performance without exceeding a power budget of the electronic device.

It is another objective of the claimed invention to provide a method for performing system power budgeting within an electronic device, and an associated apparatus, in order to achieve the goal of proactive thermal control via power consumption control.

According to at least one preferred embodiment, a method for performing system power budgeting within an electronic device is provided, where the method can be applied to at least one portion (e.g. a portion or all) of the electronic device. The method comprises the steps of: utilizing a power consumption index generator positioned in a specific subsystem to generate a power consumption index corresponding to the specific subsystem, wherein the electronic device comprises a plurality of subsystems, and the specific subsystem is one of the plurality of subsystems; and performing configuration adjustment on at least one portion of the electronic device according to the power consumption index corresponding to the specific subsystem.

According to at least one preferred embodiment, an apparatus for performing system power budgeting within an electronic device is also provided, where the apparatus may comprise at least one portion (e.g. a portion or all) of the electronic device, and the electronic device may comprise a plurality of subsystems. The apparatus comprises a power consumption index generator that is positioned in a specific subsystem of the plurality of subsystems, and comprises a processing circuit (e.g. at least one processor, or at least one controller) that is coupled to the power consumption index generator. More particularly, the power consumption index generator is capable of generating a power consumption index corresponding to the specific subsystem. In addition, the processing circuit is capable of performing configuration adjustment on at least one portion of the electronic device according to the power consumption index corresponding to the specific subsystem. For example, at least one portion (e.g. a portion or all) of the processing circuit may be integrated into one of the plurality of subsystems. In another example, the processing circuit may be positioned outside the plurality of subsystems.

According to at least one preferred embodiment, an apparatus for performing system power budgeting within an electronic device is also provided, where the apparatus may comprise at least one portion (e.g. a portion or all) of the electronic device. The apparatus comprises a processing circuit (e.g. at least one processor, or at least one controller) that is coupled to a plurality of subsystems positioned within the electronic device. For example, the plurality of subsystems may comprise hardware circuits. The processing circuit is capable of performing configuration adjustment on at least one portion of the electronic device according to a power consumption index corresponding to a specific subsystem of the plurality of subsystems. In addition, the specific subsystem comprises a power consumption index generator. More particularly, the power consumption index generator is capable of generating the power consumption index corresponding to the specific subsystem. For example, at least one portion (e.g. a portion or all) of the processing circuit may be integrated into one of the plurality of subsystems. In another example, the processing circuit may be positioned outside the plurality of subsystems.

It is an advantage of the present invention that the present invention method and the associated apparatus can enhance the overall performance of the electronic system with fewer side effects. In addition, the present invention method and the associated apparatus can perform system power budgeting in a proactive manner. For example, a power consumption index generator (e.g. a digital or an analog power consumption index generator) and a power limiter (may be implemented by hardware, software, firmware or a combination thereof) may be utilized to manage the system power (or battery) budget and the system temperature. Instead of reactive indicators such as generated heat or IR drop (i.e. a voltage drop across at least one resistance component, such as the product of the current (I) passing through the aforementioned at least one resistance component having a resistance value (R)), the power consumption index generator can be placed in at least one subsystem of the electronic device to indicate the power consumption of the subsystem, so that the power consumption can be managed proactively. As a result, the goal of fine-grained thermal control (e.g. throttling) and proactive battery resource allocation may be achieved. Additionally, in comparison with the related art such as a conventional architecture operates in a reactive manner, the present invention method and the associated apparatus can prevent the related art problems.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
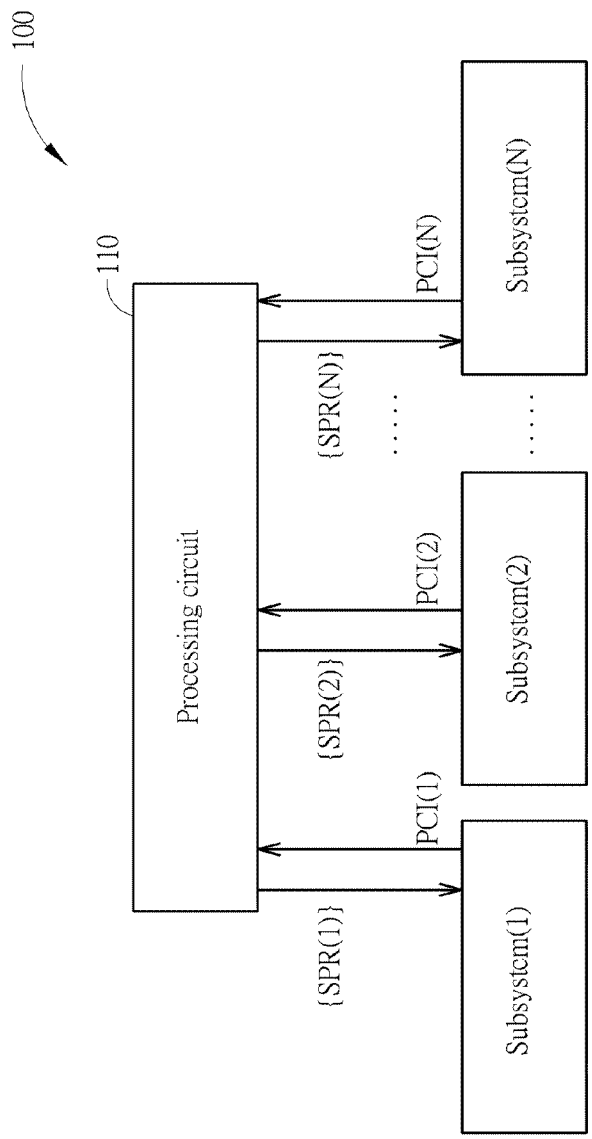
FIG. 1 is a diagram of an apparatus for performing system power budgeting within an electronic device according to an embodiment of the present invention.

FIG. 1 is a diagram of an apparatus 100 for performing system power budgeting within an electronic device according to an embodiment of the present invention, where the apparatus 100 may comprise at least one portion (e.g. a portion or all) of the electronic device. The apparatus 100 may comprise a portion of the electronic device mentioned above, and for example, can be at least one hardware circuitry such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a mobile phone (e.g. a multifunctional mobile phone), a personal digital assistant (PDA), a tablet, a wearable device, and a personal computer such as a laptop computer.

According to this embodiment, the electronic device may comprise a plurality of subsystems, such as a set of subsystems Subsystem(1), Subsystem(2), . . . , and Subsystem(N) shown in FIG. 1, where the notation N may represent a positive integer that is greater than or equal to one, and therefore the number of subsystems within the set of subsystems Subsystem(1), Subsystem(2), . . . , and Subsystem (N) may be greater than or equal to one. The apparatus 100 may comprise a processing circuit 110 (e.g. at least one processor, or at least one controller) that is coupled to power consumption index generator(s) positioned in the subsystem(s). As mentioned above, the apparatus 100 may comprise at least one portion (e.g. a portion or all) of the electronic device, and therefore, the set of subsystems Subsystem(1), Subsystem(2), . . . , and Subsystem(N) can be illustrated within the apparatus 100, for better comprehension. This is for illustrative purposes only, and is not meant to be a limitation of the present invention. In general, one or more of the set of subsystems Subsystem(1), Subsystem (2), . . . , and Subsystem(N) can be illustrated outside the apparatus 100. For some examples, all of the set of subsystems Subsystem(1), Subsystem(2), . . . , and Subsystem(N) can be illustrated outside the apparatus 100.

In the architecture shown in FIG. 1, the processing circuit 110 is positioned outside the set of subsystems Subsystem (1), Subsystem(2), . . . , and Subsystem(N). For example, in a situation where the plurality of subsystems is equivalent to the set of subsystems Subsystem(1), Subsystem(2), . . . , and Subsystem(N), the processing circuit 110 is positioned outside the plurality of subsystems. This is for illustrative purposes only, and is not meant to be a limitation of the present invention. According to some embodiments of the present invention, at least one portion (e.g. a portion or all) of the processing circuit 110 may be integrated into one or more of the plurality of subsystems. For one example, one or more of the subsystems Subsystem(1), Subsystem (2), . . . , and Subsystem(N) may contain a portion or all of the processing circuit 110. For another example, in addition to the set of subsystems Subsystem(1), Subsystem(2), . . . , and Subsystem(N), the plurality of subsystems may further comprise a subsystem Subsystem(0), and the processing circuit 110 may be integrated into the subsystem Subsystem (0).

No matter whether the processing circuit 110 is positioned outside the plurality of subsystems or is partially or fully integrated into one of the plurality of subsystems, the plurality of subsystems may comprise hardware circuits, and the apparatus 100 may comprise a power consumption index generator that is positioned in a specific subsystem of the plurality of subsystems, where the processing circuit 110 is coupled to the power consumption index generator. The power consumption index generator is capable of generating a power consumption index corresponding to the specific subsystem. In addition, the processing circuit 110 may be capable of performing configuration adjustment on at least one portion (e.g. a portion or all) of the electronic device according to the power consumption index corresponding to the specific subsystem.

In one embodiment, each subsystem of the plurality of subsystems, such as the subsystem(n), may comprise a power consumption index generator PCIG(n) that is capable of generating a power consumption index PCI(n) corresponding to this subsystem Subsystem(n), no matter whether the index n falls within the range of the interval[0, N] or falls within the range of the interval[1, N]. For example, the power consumption index generator PCIG(n) may generate the power consumption index PCI(n) according to at least one model (e.g. one or more models) and/or according to at least one condition (e.g. one or more conditions) of the subsystem(n). The model(s) may refer to an equation to calculate power consumption, a table to record power consumption of component(s), a power meter to measure power consumption, etc. In addition, the processing circuit 110 may be capable of performing configuration adjustment on at least one portion (e.g. a portion or all) of the electronic device according to the power consumption indexes {PCI(n)} respectively corresponding to the subsystems {Subsystem(n)}, such as the power consumption indexes PCI(1), PCI(2), . . . , and PCI(N) respectively corresponding to the set of subsystems Subsystem(1), Subsystem(2), . . . , and Subsystem(N).

In one embodiment, the processing circuit 110 may utilize at least one software programmable register SPR (e.g. one or more software programmable registers) or at least one set of software programmable registers {SPR} (e.g. one or more sets of software programmable registers) to control the operations of generating the power consumption index PCI(n) in at least one subsystem such as the subsystem Subsystem(n). For example, the value(s) stored in software programmable register(s) SPR may comprise parameter(s) (and/or coefficient(s)) for controlling the aforementioned at least one model, and therefore the operations of generating the power consumption index PCI(n) in at least one subsystem Subsystem(n) may vary in response to the value(s) stored in the software programmable register(s) SPR, and may be enhanced by adjusting at least one portion (e.g. a portion or all) of the value(s) stored in the at least one software programmable register SPR or at least one set of software programmable registers {SPR}.

For example, the processing circuit 110 may write/update values in N sets of software programmable registers {SPR(1)}, {SPR(2)}, . . . , and {SPR(N)} in the subsystems Subsystem(1), Subsystem(2), . . . , and Subsystem(N), respectively, to control the operations of generating the power consumption indexes PCI(1), PCI(2), . . . , and PCI(N) in the subsystems Subsystem(1), Subsystem(2), . . . , and Subsystem(N), respectively. This is for illustrative purposes only, and is not meant to be a limitation of the present invention. According to some embodiments of the present invention, in a situation where the plurality of subsystems further comprises the subsystem Subsystem(0) and at least one portion (e.g. a portion or all) of the processing circuit 110 is integrated into the subsystem Subsystem(0), the processing circuit 110 may utilize (N+1) sets of software programmable registers {SPR(0), SPR(1)}, . . . , and {SPR(N)} to control the operations of generating the power consumption indexes PCI(0), PCI(1), . . . , and PCI(N) in the subsystems Subsystem(0), Subsystem(1), . . . , and Subsystem(N), respectively.

In the embodiment shown in FIG. 1, the apparatus 100 may comprise a plurality of subsystems such as the set of subsystems Subsystem(1), Subsystem(2), . . . , and Subsystem(N). This is for illustrative purposes only, and is not meant to be a limitation of the present invention. According to some embodiments of the present invention, it is unnecessary that the whole of the set of subsystems Subsystem(1), Subsystem(2), . . . , and Subsystem(N) is regarded as a portion of the apparatus 100. For example, the apparatus 100 of these embodiments may still comprise the processing circuit 110, and at least one portion (e.g. a portion or all) of the processing circuit may be integrated into one of the plurality of subsystems, or may be positioned outside the plurality of subsystems. According to one of these embodiments, in a situation where the plurality of subsystems is equivalent to the set of subsystems Subsystem(1), Subsystem(2), . . . , and Subsystem(N), the processing circuit 110 may be positioned outside the plurality of subsystems. According to another of these embodiments, in a situation where the plurality of subsystems further comprises the subsystem Subsystem(0) (i.e. the plurality of subsystems comprises the subsystems Subsystem(0), Subsystem(1) and Subsystem(N)), at least one portion (e.g. a portion or all) of the processing circuit 110 may be integrated into the subsystem Subsystem(0).

Some implementation details regarding the aforementioned power consumption index generator PCIG(n) are described as follows. According to some embodiments, each subsystem may comprise one or more counter(s) and one or more software programmable register(s). For example, each counter within the one or more counter(s) may correspond to a predefined event that may consume power, and this counter may count the number of occurrence of this predefined event. The associated software programmable register within the one or more software programmable register(s), such as that corresponding to this counter, may store the power consumption value of this event. This is for illustrative purposes only, and is not meant to be a limitation of the present invention. According to some embodiments, a software programmable register within the one or more software programmable register(s) may store weightings of the power respectively consumed by a plurality of predefined events. For example, in a situation where the ratio of the power consumed by event A to the power consumed by event B is equivalent to two, the weighting of event A can be set as 1 and the weighting of event B can be set as 0.5. This is for illustrative purposes only, and is not meant to be a limitation of the present invention.

According to some embodiments, the aforementioned power consumption index generator PCIG(n) can be an analog current meter positioned in the subsystem Subsystem(n). According to some embodiments, the software programmable register(s) SPR(n) can be positioned outside the subsystem Subsystem(n).

Figure 2:
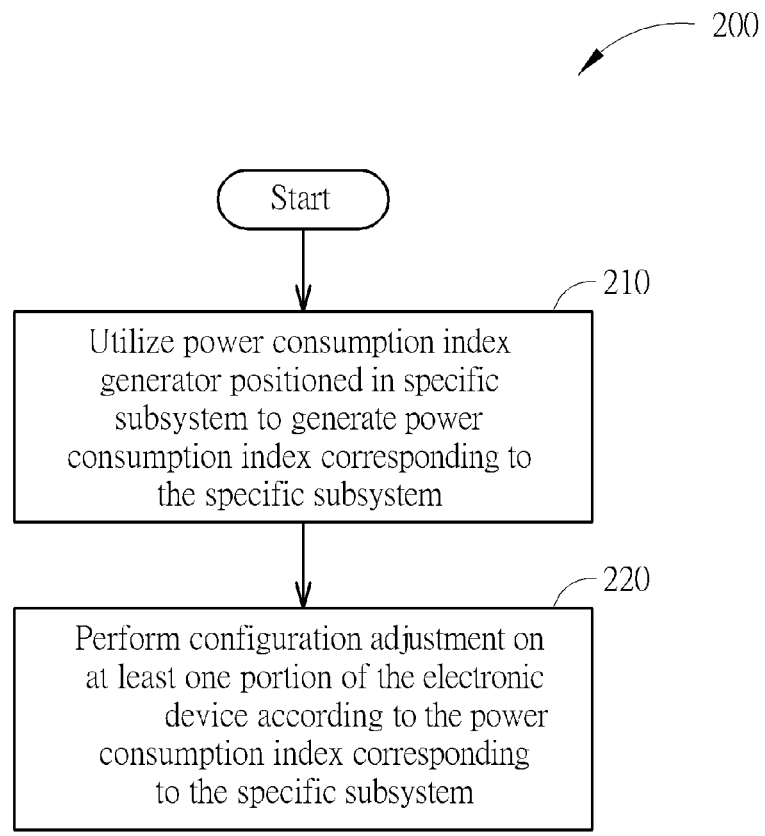
FIG. 2 illustrates a flowchart of a method for performing system power budgeting within an electronic device according to an embodiment of the present invention.

FIG. 2 illustrates a flowchart of a method 200 for performing system power budgeting within an electronic device according to an embodiment of the present invention. The method 200 can be applied to the apparatus 100 mentioned above (e.g. the apparatus 100 shown in FIG. 1, or the apparatus 100 of some embodiments described above), and can be applied to the processing circuit 110 therein (e.g. the processing circuit 110 shown in FIG. 1, or the processing circuit 110 in the apparatus 100 of some embodiments described above). The method can be described as follows.

In Step 210, the processing circuit 110 may utilize a power consumption index generator positioned in a specific subsystem such as that mentioned above to generate a power consumption index corresponding to the specific subsystem, where the specific subsystem mentioned in Step 210 may represent any subsystem of the plurality of subsystems. For example, in a situation where the specific subsystem represents the subsystem Subsystem(n), the processing circuit 110 may utilize the power consumption index generator PCIG(n) positioned in the subsystem Subsystem(n) to generate the power consumption index PCI(n) corresponding to the subsystem Subsystem(n), no matter whether the index n falls within the range of the interval[0, N] or falls within the range of the interval[1, N]. For example, when needed, the processing circuit 110 may utilize the power consumption index generators {PCIG(n)} respectively positioned in the subsystems {Subsystem(n)} to generate the power consumption indexes {PCI(n)} respectively corresponding to the subsystems {Subsystem(n)}.

In Step 220, the processing circuit 110 may perform configuration adjustment on at least one portion (e.g. a portion or all) of the electronic device according to the power consumption index corresponding to the specific subsystem. Thus, the processing circuit 110 may dynamically adjust configuration(s) of at least one portion (e.g. a portion or all) of the electronic device in response to the power consumption index corresponding to the specific subsystem. In one embodiment, the processing circuit 110 may obtain the power consumption index corresponding to the specific subsystem, and may obtain another power consumption index corresponding to the other subsystem with aid of another power consumption index generator positioned in another subsystem, and may perform the configuration adjustment on the aforementioned at least one portion of the electronic device in Step 220 according to the power consumption index corresponding to the specific subsystem and according to the other power consumption index corresponding to the other subsystem. For one example, the processing circuit 110 may dynamically adjust configuration(s) of at least one portion (e.g. a portion or all) of the electronic device in response to at least one portion (e.g. a portion or all) of the power consumption indexes {PCI(n)} respectively corresponding to the subsystems {Subsystem(n)}, no matter whether the index n falls within the range of the interval[0, N] or falls within the range of the interval[1, N].

According to this embodiment, the power consumption index corresponding to the specific subsystem may represent a power consumption value of the specific subsystem, and the processing circuit 110 may perform the configuration adjustment on the aforementioned at least one portion of the electronic device in Step 220 according to the power consumption value of the specific subsystem. This is for illustrative purposes only, and is not meant to be a limitation of the present invention. According to some embodiments of the present invention, the power consumption index corresponding to the specific subsystem may be proportional to the power consumed by the specific subsystem, and the processing circuit 110 may determine the power consumption value of the specific subsystem according to the power consumption index corresponding to the specific subsystem, and may perform the configuration adjustment on the aforementioned at least one portion of the electronic device in Step 220 according to the power consumption value of the specific subsystem. According to some embodiments, the power consumption index corresponding to the specific subsystem may indicate the variation of the power consumption value of the specific subsystem with respect to time, such as a slope of a curve of the power consumption value of the specific subsystem with respect to time.

According to some embodiments, the power consumption index corresponding to the specific subsystem may indicate a specific status of the specific subsystem, and the specific status may be a predefined status within a plurality of predefined statuses of the specific subsystem. In addition, the processing circuit 110 may determine the power consumption value of the specific subsystem according to the specific status indicated by the power consumption index corresponding to the specific subsystem, and may perform the configuration adjustment on the aforementioned at least one portion of the electronic device in Step 220 according to the power consumption value of the specific subsystem.

According to some embodiments, the processing circuit 110 may perform the configuration adjustment on the aforementioned at least one portion of the electronic device in Step 220 according to the power consumption index corresponding to the specific subsystem, to enhance the performance of the electronic device without exceeding a power budget of the electronic device. For example, the power budget may represent a predetermined total power consumption value of the electronic device, and the processing circuit 110 may determine a remaining power consumption value within the power budget by subtracting at least the power consumption value of the specific subsystem from the power budget, where the power consumption value of the specific subsystem in these embodiments may be associated to the power consumption index corresponding to the specific subsystem. In addition, the processing circuit 110 may monitor whether one of a plurality of predicted power consumption values of the aforementioned at least one portion of the electronic device (i.e. the "at least one portion of the electronic device" mentioned in Step 220) is greater than the remaining power consumption value, where the plurality of predicted power consumption values may be associated to a plurality of predetermined configurations of the electronic device, respectively. Additionally, the configuration adjustment may be performed by selecting one of the plurality of predetermined configurations of the electronic device.

According to some embodiments, with aid of the processing circuit 110, the electronic device may generate predicted time information of an application running on the electronic device according to the power consumption index corresponding to the specific subsystem, where the predicted time information of this application may indicate the remaining time that this application runs on the electronic device without encountering shutdown of the electronic device. In addition, the electronic device may output a notification regarding this application running on the electronic device. For example, this notification may comprise the predicted time information of this application.

According to some embodiments, with aid of the processing circuit 110, the electronic device may generate power consumption information of an application running on the electronic device according to the power consumption index corresponding to the specific subsystem, where the power consumption information of this application may indicate the power consumed by running this application. In addition, the electronic device may output a notification regarding this application running on the electronic device. For example, this notification may comprise the power consumption information of this application.

According to some embodiments, the processing circuit 110 may perform the configuration adjustment on the aforementioned at least one portion of the electronic device in Step 220 according to the power consumption index corresponding to the specific subsystem, to perform proactive thermal control by controlling the power consumption of the electronic device.

Figure 3:
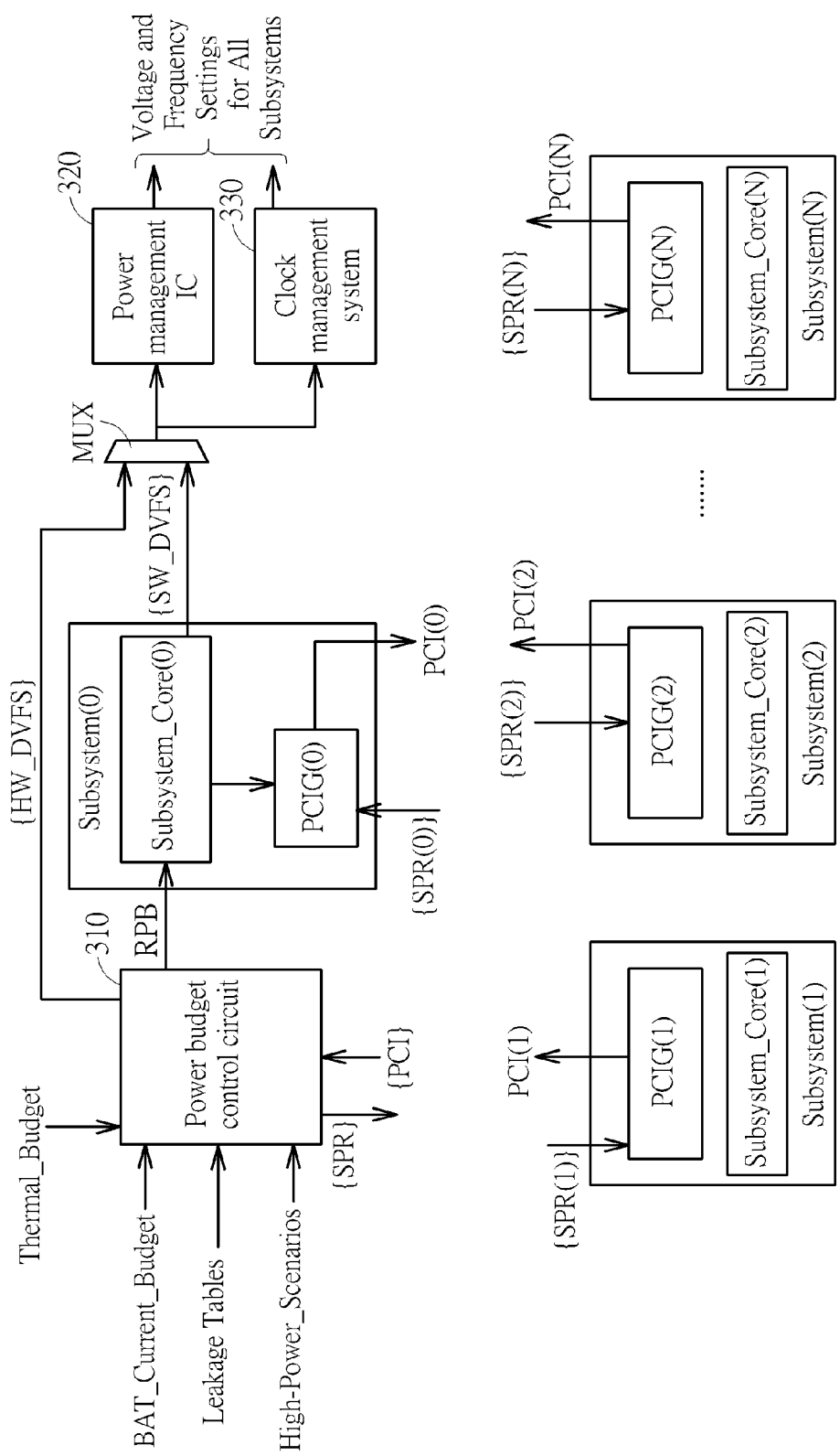
FIG. 3 illustrates a system block diagram involved with the method shown in FIG. 2 according to an embodiment of the present invention.

FIG. 3 illustrates a system block diagram involved with the method 200 shown in FIG. 2 according to an embodiment of the present invention. As shown in FIG. 3, the electronic device of this embodiment may comprise the subsystems Subsystem(0), Subsystem(1), Subsystem (2), . . . , and Subsystem(N), a power budget control circuit 310, a power management IC 320, a clock management system 330, and a multiplexing circuit MUX, where the subsystems Subsystem(0), Subsystem(1), Subsystem (2), . . . , and Subsystem(N) may be equipped with the power consumption index generators PCIG(0), PCIG(1), PCIG (2), . . . , and PCIG(N), respectively, and the multiplexing circuit MUX may comprise at least one multiplexer (e.g. one or more multiplexers). For example, the power budget control circuit 310 of this embodiment may be implemented with a micro control unit (MCU), and therefore can be referred to as a power MCU. In addition, each of the subsystems, such as the Subsystem(n), may comprise a subsystem core Subsystem_Core(n) capable of performing operations of the Subsystem(n), and can be regarded as the main circuit of the Subsystem(n). Thus, the subsystem cores Subsystem_Core(0), Subsystem_Core(1), Subsystem_Core (2), . . . , and Subsystem_Core(N) are capable of controlling the subsystems Subsystem(0), Subsystem(1), Subsystem (2), . . . , and Subsystem(N) to perform their own operations, respectively. For one example, the processing circuit 110 mentioned in some embodiments above may comprise the power budget control circuit 310 or any other component capable of performing configuration adjustment on at least one portion of the electronic device. In some examples, the configuration adjustment mentioned in Step 220 may be performed with aid of the subsystem core Subsystem_Core (0), the power management IC 320, the clock management system 330, and the multiplexing circuit MUX.

The processing circuit 110 (for example, the power budget control circuit 310 in this embodiment) may utilize one or more software programmable registers SPR to control the operation of generating the power consumption index PCI (n) such as the (N+1) power consumption indexes PCI(0), PCI(1), PCI(2), . . . , and PCI(N). As shown in FIG. 3, the power budget control circuit 310 may write/update values in the plurality of sets of software programmable registers {SPR}, such as the (N+1) sets of software programmable registers {SPR(0)}, SPR(1)}, {SPR(2)}, . . . , and {SPR(N)}, in the power consumption index generators {PCIG(n)} such as the (N+1) power consumption index generators PCIG(0), PCIG(1), PCIG(2), . . . , and PCIG(N), respectively, and may collect the power consumption indexes {PCI(n)} from the power consumption index generators {PCIG(n)}, respectively. As the processing circuit 110 is capable of utilizing the plurality of sets of software programmable registers {SPR} to control the operations of generating the power consumption indexes {PCI(n)}, respectively, the accuracy of controlling the power budget can be tuned and enhanced, where the values stored in the plurality of sets of software programmable registers {SPR} may be tuned for controlling the power budget more accurately, and the enhanced sets of values of the plurality of sets of software programmable registers {SPR} may be preliminarily stored in the processing circuit 110 and/or may be preliminarily loaded onto the processing circuit 110. As a result, the apparatus 100 of this embodiment, such as the architecture shown in FIG. 3, is capable of more properly and accurately performing system power budgeting within the electronic device.

For example, the processing circuit 110 may perform system power budgeting by adjusting voltage and/or frequency settings of one or more of the (N+1) subsystems {Subsystems(n)} according to at least one portion (e.g. a portion or all) of the (N+1) power consumption indexes {PCI(n)}. In one example, the processing circuit 110 may proactively apply proper values of the voltage and frequency settings for all subsystems within the electronic device in response to the latest values of the (N+1) power consumption indexes {PCI(n)}, where dynamic voltage and frequency scaling (DVFS) can be taken as an example of the configuration adjustment performed on the aforementioned at least one portion of the electronic device in Step 220. Regarding the configuration adjustment performed on the aforementioned at least one portion of the electronic device in Step 220, one or more control schemes within a plurality of control schemes may be utilized at the same time based on the architecture shown in FIG. 3. Examples of the plurality of control schemes may include, but not limited to, a software (SW) DVFS control scheme, and a hardware (HW) DVFS control scheme.

According to this embodiment, the power budget control circuit 310 may perform power budget calculations according to one or more inputs of the power budget control circuit 310, to generate one or more of multiple outputs of the power budget control circuit 310, where the number of activated outputs within the multiple outputs of the power budget control circuit 310 may depend on the activated control schemes within the plurality of control schemes. Examples of the one or more inputs of the power budget control circuit 310 may include, but not limited to, the thermal budget information Thermal_Budget (e.g. the current temperature, the target temperature, and the temperature slope ($\Delta T/\Delta$ time) such as the temperature variation divided by the associated time interval "$\Delta$ time" in which the temperature varies), the battery (BAT) current budget information BAT_Current_Budget (e.g. the power budget (or Allowable-power/$\Delta$ time), the battery level, and the low-battery awareness threshold), the leakage tables (e.g. the table of the leakage current vs. the supply voltage, the table of the leakage current vs. the temperature and/or the table of the leakage current vs. the process for each subsystem), the high-power scenarios information High-Power_Scenarios (the scenarios consuming high power such as using the camera flash, etc.), and the power consumption indexes {PCI(n)}.

In addition, examples of the multiple outputs of the power budget control circuit 310 may include, but not limited to, the remaining power budget information RPB, and the hardware DVFS information {HW_DVFS}. For example, the processing circuit 110 (e.g. the power budget control circuit 310 or the Subsystem_Core(0)) may utilize the remaining power budget information RPB to generate the software DVFS information {SW_DVFS} in the software DVFS control scheme, for performing software DVFS operations. In another example, the processing circuit 110 may utilize the hardware DVFS information {HW_DVFS} in the hardware DVFS control scheme, for performing hardware DVFS operations.

According to some embodiments, the subsystem core Subsystem_Core(n) can be implemented with a processor (or a processing circuit). This is for illustrative purposes only, and is not meant to be a limitation of the present invention. According to some embodiments of the present invention, the subsystem core Subsystem_Core(n) can be implemented with any of another type of circuits, where the subsystem core Subsystem_Core(n) is the main circuit of the Subsystem(n).

Please note that examples of the configuration adjustment mentioned in Step 220 may include, but not limited to, configuration adjustment operations of the HW DVFS type (i.e. HW-DVFS-type configuration adjustment operations), and configuration adjustment operations of the SW DVFS type (i.e. SW-DVFS-type configuration adjustment operations). Regarding the HW-DVFS type configuration adjustment operations, when it is detected that a power consumption level indicated by a portion or all of the collected information (e.g. the power consumption indexes {PCI(n)}, the thermal budget information Thermal_Budget, the battery current budget information BAT_Current_Budget, the leakage tables, and/or the high-power scenarios information High-Power_Scenarios) is less than a predetermined power budget level, the power budget control circuit 310 may configure the power management IC 320 and/or the clock management system 330, to perform voltage and/or frequency scaling operations, in order to enhance the performance of one or more subsystems. For example, the path of the hardware DVFS information HW DVFS can be regarded as a control path for the power budget control circuit 310 to configure the power management IC 320 and/or the clock management system 330 to perform voltage and/or frequency scaling operations. Some implementation details regarding the HW-DVFS-type configuration adjustment operations are described in the embodiment shown in FIG. 5. In addition, regarding the SW-DVFS type configuration adjustment operations, the subsystem core Subsystem_Core (0) may receive the remaining power budget information RPB, the power consumption index PCI(n) and/or other information, to configure the power management IC 320 and/or the clock management system 330 to perform voltage and/or frequency scaling operations, in order to enhance the performance of one or more subsystems. Some implementation details regarding SW-DVFS-type configuration adjustment operations are described in the embodiment shown in FIG. 4. According to some embodiments, one or more examples of the configuration adjustment mentioned in Step 220 (e.g. the HW-DVFS-type configuration adjustment operations, and/or the SW-DVFS-type configuration adjustment operations) can be utilized at the same time. Besides, though in the embodiments shown in FIGS. 4-6, the configuration adjustment operations may be triggered and/or performed by the power budget control circuit 310 and the subsystem core Subsystem_Core(0), any component capable of configuring the power management IC 320 and/or the clock management system 330 may trigger and/or perform the configuration adjustment operations.

Figure 4:
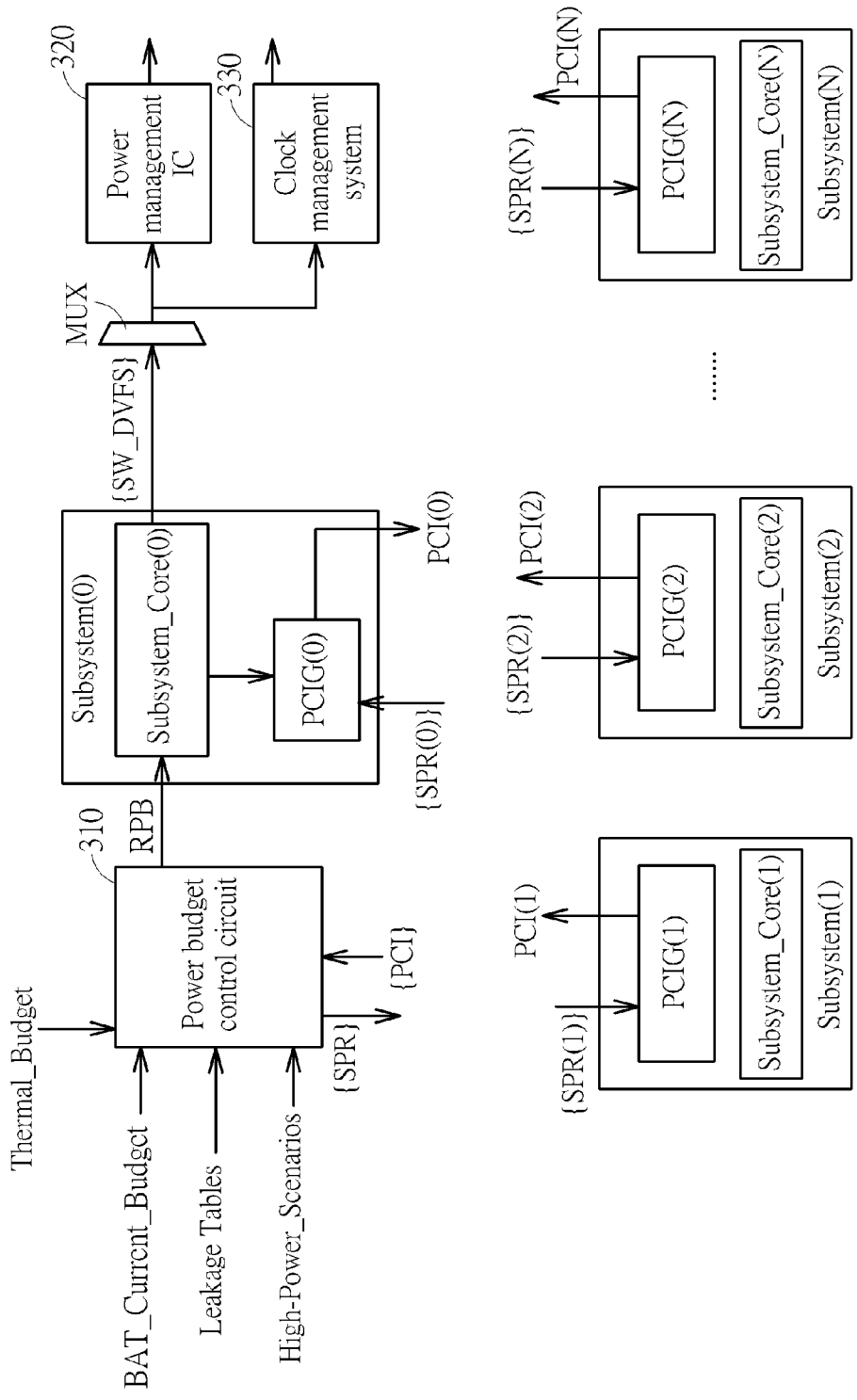
FIG. 4 illustrates a software dynamic voltage and frequency scaling (DVFS) control scheme involved with the method shown in FIG. 2 according to an embodiment of the present invention.

FIG. 4 illustrates the software DVFS control scheme involved with the method 200 shown in FIG. 2 according to an embodiment of the present invention. Though in this embodiment, the subsystem core Subsystem_Core(0) may control the power management IC 320 and/or the clock management system 330 to perform the software DVFS operations, any component capable of controlling the power management IC 320 and/or the clock management system 330 falls within the scope of the invention. Please note that the software DVFS operations can be taken as an example of the configuration adjustment performed on the aforementioned at least one portion of the electronic device in Step 220.

For example, under a given thermal and/or power budget, the processing circuit 110 of the architecture shown in FIG. 4 (e.g. power budget control circuit 310 and/or Subsystem_core(0)) may proactively output enhanced voltage and/or frequency settings to keep a portion of or the whole system of the electronic device at high performance (e.g. the highest performance available, without exceeding the given thermal and/or power budget). For example, based on application scenarios and/or the remaining power budget information RPB, the subsystem core Subsystem_Core(0) may output enhanced DVFS settings for thermal and battery control through the software DVFS information {SW_DVFS}. In addition, as the software DVFS control scheme may be applied to the architecture shown in FIG. 3, the multiplexing circuit MUX may select the software DVFS information {SW_DVFS}, for being sent toward the power management IC 320 and/or the clock management system 330, where the multiplexing circuit MUX may still select the hardware DVFS information {HW_DVFS} for being sent toward the power management IC 320 and/or the clock management system 330 when needed. As a result, under the aforementioned given thermal and power budget, the power management IC 320 may proactively apply enhanced voltage settings and/or the clock management system 330 may proactively apply enhanced frequency settings (or enhanced clock frequency settings), to keep a portion of or the whole system of the electronic device at high performance (e.g. the highest performance available, without exceeding the given thermal and power budget).

Figure 5:
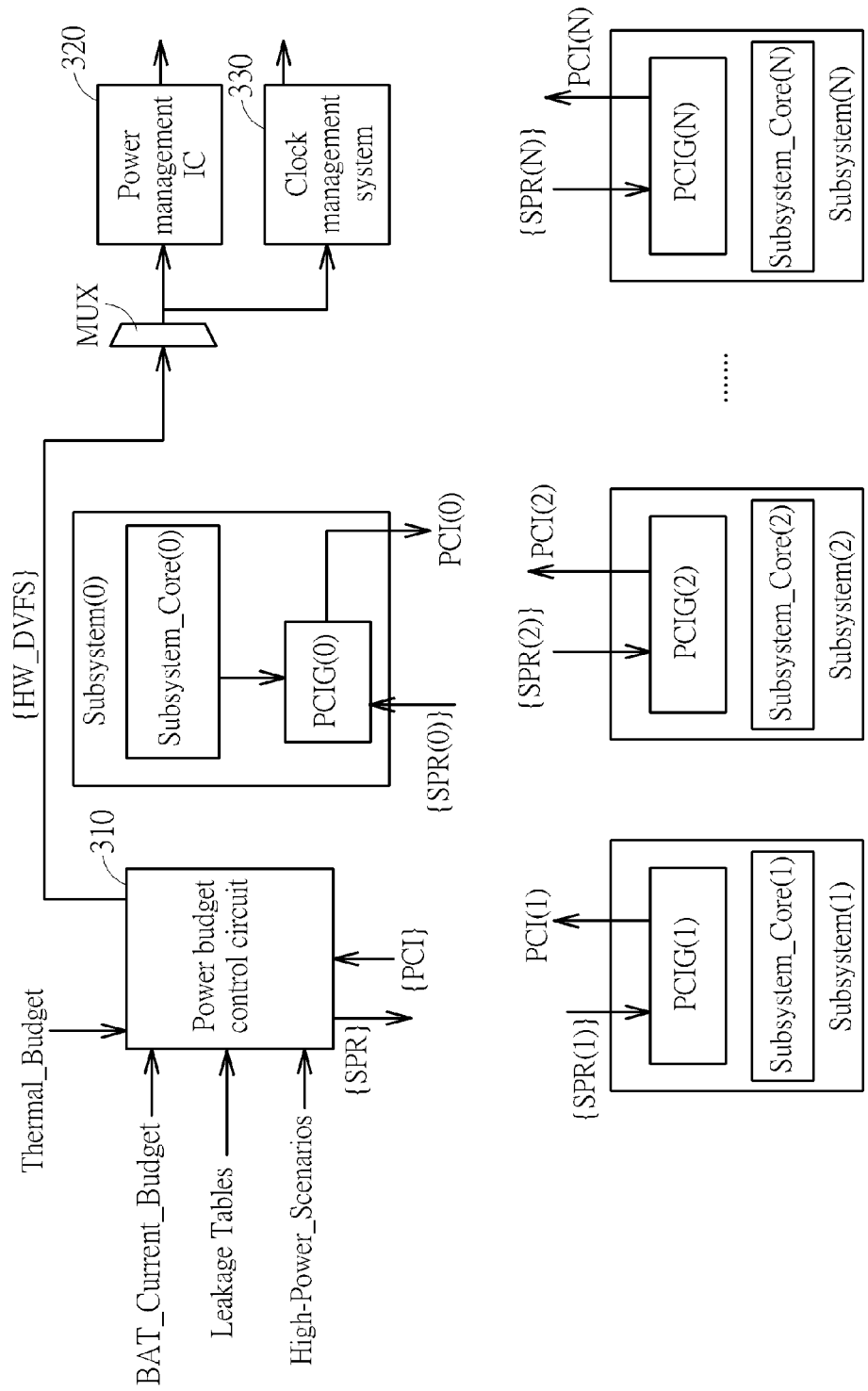
FIG. 5 illustrates a hardware DVFS control scheme involved with the method shown in FIG. 2 according to an embodiment of the present invention.

FIG. 5 illustrates the hardware DVFS control scheme involved with the method 200 shown in FIG. 2 according to an embodiment of the present invention. Though in this embodiment, the power budget control circuit 310 may control the power management IC 320 and/or the clock management system 330 to perform the hardware DVFS operations, any component capable of controlling the power management IC 320 and/or the clock management system 330 falls within the scope of the invention. Please note that the hardware DVFS operations can be taken as an example of the configuration adjustment performed on the aforementioned at least one portion of the electronic device in Step 220.

For example, the processing circuit 110 (e.g. power budget control circuit 310) of the architecture shown in FIG. 5 may proactively output enhanced voltage and/or frequency settings to keep a portion of or the whole system of the electronic device at high performance (e.g. the highest performance available, without exceeding the given thermal and/or power budget). For example, the power budget control circuit 310 may utilize the hardware DVFS information {HW_DVFS} to directly control the power management IC 320 and/or the clock management system 330. As the hardware DVFS control scheme may be applied to the architecture shown in FIG. 3, the multiplexing circuit MUX may select the hardware DVFS information {HW_DVFS}, for being sent toward the power management IC 320 and/or the clock management system 330, where the multiplexing circuit MUX may still select the software DVFS information {SW_DVFS} for being sent toward the power management IC 320 and/or the clock management system 330 when needed. As a result, the power management IC 320 may proactively apply enhanced voltage settings and/or the clock management system 330 may proactively apply enhanced frequency settings (or enhanced clock frequency settings), to keep a portion of or the whole system of the electronic device at high performance (e.g. the highest performance available, without exceeding the given thermal and power budget).

Figure 6:
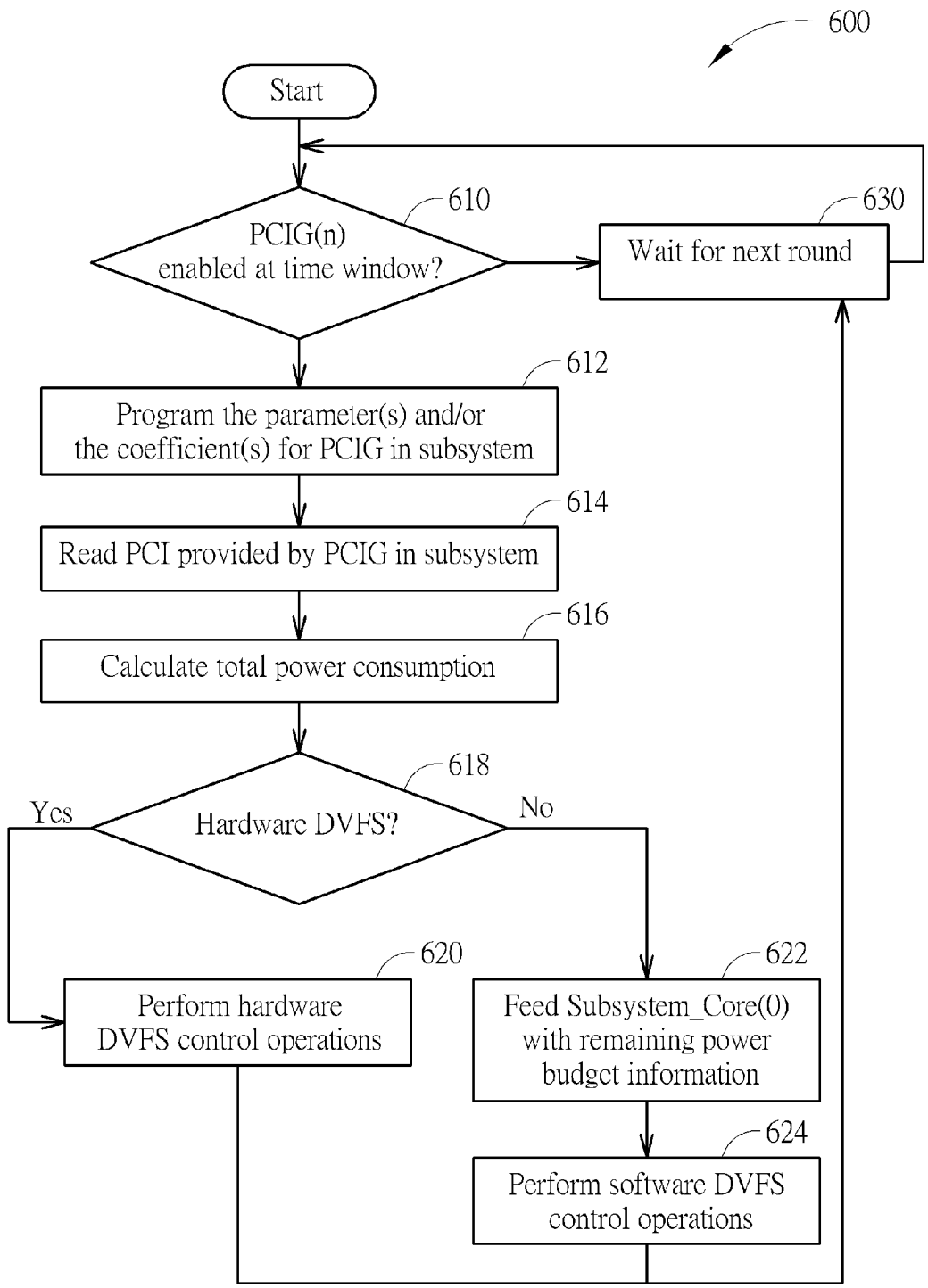
FIG. 6 illustrates a working flow involved with the method shown in FIG. 2 according to an embodiment of the present invention.

FIG. 6 illustrates a working flow 600 involved with the method 200 shown in FIG. 2 according to an embodiment of the present invention. For example, the working flow 600 can be applied to the power budget control circuit 310 and/or the subsystem core Subsystem_Core(0) shown in FIG. 3, however, any component capable of controlling the power management IC 320 and/or the clock management system 330 falls within the scope of the invention. In addition, when needed, the processing circuit 110 (e.g. the power budget control circuit 310) may selectively enable one or more of the power consumption index generators {PCIG(n)}, and may switch between enabling the power consumption index generator(s) PCIG(n) and disabling the power consumption index generator(s) PCIG(n).

In Step 610, the power budget control circuit 310 may check whether the power consumption index generator(s) PCIG(n) is/are enabled at the current time window. When it is detected that the power consumption index generator(s) PCIG(n) is/are enabled at this time window, Step 612 is entered; otherwise, Step 630 is entered.

In Step 612, the power budget control circuit 310 may program (or write) the parameter(s) and/or the coefficient(s) for the power consumption index generator(s) PCIG(n) in the subsystem(s) Subsystem(n).

In Step 614, the power budget control circuit 310 may read the power consumption index(es) PCI(n) provided by the power consumption index generator(s) PCIG(n) in the subsystem(s) Subsystem(n).

In Step 616, the power budget control circuit 310 may calculate the total power consumption of subsystems according to the power consumption indexes PCI(n) if the steps 610-614 are performed for multiple subsystems. And if the steps 610-614 are performed for all subsystems of the electronic device, the total power consumption of the electronic device may be obtained. The remaining power budget may be obtained as the total power consumption is obtained.

In Step 618, which component to control voltage and/or frequency scaling is decided. In one embodiment, the decision may be made based on which component has easier access to information of the subsystem to be adjusted. For example, if the configuration of the subsystem Subsystem(n) is to be adjusted and the power budget control circuit 310 has easier access to information of the subsystem Subsystem(n), the voltage and/or frequency scaling may be controlled by the power budget control circuit 310, thus Step 620 may be entered. If the configuration of the subsystem Subsystem(n) is to be adjusted and the subsystem core Subsystem_Core(0) has easier access to information of the subsystem Subsystem(n), the voltage and/or frequency scaling may be controlled by the subsystem core Subsystem_Core(0), thus Step 622 may be entered.

In Step 620, the power budget control circuit 310 may perform hardware DVFS control operations. For example, the power budget control circuit 310 may utilize the hardware DVFS information {HW_DVFS} to directly control the power management IC 320 and/or the clock management system 330. As a result, the power management IC 320 may proactively apply enhanced voltage settings and/or the clock management system 330 may proactively apply enhanced frequency settings (or enhanced clock frequency settings), to keep a portion of or the whole system of the electronic device at high performance (e.g. the highest performance available, without exceeding the given thermal and power budget).

In Step 622, the power budget control circuit 310 may feed the subsystem core Subsystem_Core(0) with the remaining power budget information RPB.

In Step 624, the subsystem core Subsystem_Core(0) may perform software DVFS control operations. For example, the subsystem core Subsystem_Core(0) may generate the software DVFS information {SW_DVFS} in response to the remaining power budget information RPB to control the power management IC 320 and/or the clock management system 330. As a result, under the aforementioned given thermal and/or power budget, the power management IC 320 may proactively apply enhanced voltage settings and/or the clock management system 330 may proactively apply enhanced frequency settings (or enhanced clock frequency settings), to keep a portion of or the whole system of the electronic device at high performance (e.g. the highest performance available, without exceeding the given thermal and power budget).

In Step 630, the power budget control circuit 310 may wait for the next round (of operations).

It should be noted that in different embodiments, the steps shown in FIG. 6 can be executed in different orders, one or more steps may be added to the flow, and one or more steps may be omitted (e.g. Step 610 may be omitted if the power consumption index generator PCIG(n) is always enabled, Step 612 may be omitted if the parameter(s) and/or coefficient(s) are designed to be fixed, etc.).

According to some embodiments, the power budget control circuit 310 or the subsystem core Subsystem_core(0) may trigger and/or perform the configuration adjustment mentioned in Step 220. This is for illustrative purposes only, and is not meant to be a limitation of the present invention. Any component that can configure the configure power management IC 320 and/or the clock management system 330 may trigger and/or perform the configuration adjustment mentioned in Step 220.

According to some embodiments, the configuration adjustment mentioned in Step 220 can be applied to any component(s) or subsystem(s) whose performance can be enhanced or need to be enhanced. For example, in a situation where the subsystem belongs to hard real-time architecture and the performance thereof should be enhanced (for example, this subsystem is running an application playing movie(s) or a game application, which may need real time performance), the configuration adjustment mentioned in Step 220 can be applied to this subsystem to enhance the performance of this subsystem. This is for illustrative purposes only, and is not meant to be a limitation of the present invention. In general, after the total power budget for the subsystems is obtained (or determined), the configuration adjustment mentioned in Step 220 can be applied to at least one portion (e.g. a portion or all) of the subsystems, such as one or more of the subsystems, to enhance the overall performance of the portion or all of the subsystems without exceeding the total power budget, so the overall performance of the portion or all of the subsystems can be as high as possible. For example, in a situation where this portion of the subsystems belongs to the aforementioned hard real-time architecture and the performance thereof should be enhanced, the end user may feel that the overall performance of the electronic device is excellent. As a result of fully utilizing the total power budget, the apparatus 100 can prevent wasting partial power budget within the total power budget.

Some implementation details regarding obtaining (or determining) a remaining power budget within the total power budget can be described as follows. For example, any component that is capable of obtaining the power consumption index(es) PCI(n) (e.g. the power budget control circuit 310 or the subsystem core Subsystem_Core(0)) may periodically or non-periodically obtain the power consumption index(es) PCI(n) to calculate the remaining power budget. After obtaining the remaining power budget, the apparatus 100 may perform the configuration adjustment mentioned in Step 220 through voltage scaling and/or frequency scaling, to enhance the performance. In some examples, the power budget control circuit 310 may perform the configuration adjustment mentioned in Step 220 (e.g. the HW-DVFS-type configuration adjustment operations) with aid of the power management IC 320 and/or the clock management system 330. In some examples, the subsystem core Subsystem_Core (0) may perform the configuration adjustment mentioned in Step 220 (e.g. the SW-DVFS-type configuration adjustment operations) with aid of the power management IC 320 and/or the clock management system 330. This is for illustrative purposes only, and is not meant to be a limitation of the present invention. In general, any component that is capable of controlling (or configuring) the power management IC 320 and/or the clock management system 330 may perform the configuration adjustment mentioned in Step 220 through voltage scaling and/or frequency scaling, to enhance the performance. According to some embodiments, the apparatus 100 may utilize the same component to perform the configuration adjustment mentioned in Step 220 through voltage scaling and/or frequency scaling, to enhance the performance, where it is unnecessary to divide a control path for configuring the power management IC 320 and/or the clock management system 330 into two control paths (e.g. the control path of the hardware DVFS information HW_DVFS, and the control path of the software DVFS information SW_DVFS) in these embodiments.

After obtaining (or determining) the remaining power budget, many applications can be applied to the electronic device. In some examples, the apparatus 100 may increase the supply voltage(s) of at least one subsystem (e.g. the voltage(s) supplied to one or more of the subsystems) and/or the operational frequency of at least one subsystem (e.g. the operational frequency value(s) of one or more of the subsystems), to enhance the performance. In some examples, the apparatus 100 may calculate the remaining time that a specific function (e.g. making a phone call) may keep working with the remaining power of the battery, and notify the end user of this remaining time. In some examples, the apparatus 100 may calculate a power consumption value indicating the power consumed by a certain component within the electronic and/or a power consumption value indicating the power consumed by an application installed on the electronic device (or the power consumed by a subsystem running this application), and notify the end user of the power consumption value(s), so the end user may know how much power this component and/or this application consumes.

According to some embodiments, the total power budget may vary. In some examples, when the temperature of the electronic device increases, the total power budget may be decreased. In some examples, when the remaining power of the battery of the electronic device decreases, the total power budget may be decreased.

According to some embodiments, the parameter(s), the coefficient(s), the threshold(s) (e.g. the parameter(s) and/or the coefficient(s) for the power consumption index generator(s) PCIG(n), etc.) may vary by subsystems. According to some embodiments, in a situation where there are multiple parameters, multiple coefficients, and/or multiple thresholds for the same subsystem, these parameters can be different from each other, these coefficients can be different from each other, and/or these thresholds can be different from each other.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for performing system power budgeting within an electronic device, the method comprising the steps of:
    utilizing a power consumption index generator positioned in a specific subsystem to generate a power consumption index corresponding to the specific subsystem, wherein the electronic device comprises a plurality of subsystems, and-the specific subsystem is one of the plurality of subsystems; and
    performing configuration adjustment on at least one portion of the electronic device according to the power consumption index corresponding to the specific subsystem, comprising:
        performing the configuration adjustment on the at least one portion of the electronic device according to the power consumption index corresponding to the specific subsystem, to enhance performance of the electronic device without exceeding a power budget of the electronic device, wherein the power budget represents a predetermined total power consumption value of the electronic device;
    determining a remaining power consumption value within the power budget by subtracting at least a power consumption value of the specific subsystem from the power budget wherein the power consumption value of the specific subsystem is associated to the power consumption index corresponding to the specific subsystem;
    monitoring whether one of a plurality of predicted power consumption values of the at least one portion of the electronic device is greater than the remaining power consumption value, wherein the plurality of predicted power consumption values is associated to a plurality of predetermined configurations of the electronic device, respectively;
    wherein the configuration adjustment is performed by selecting one of the plurality of predetermined configurations of the electronic device;
    and generating predicted time information of an application running on the electronic device according to the power consumption index corresponding to the specific subsystem, wherein the predicted time information of the application indicates remaining time that the application runs on the electronic device without encountering shutdown of the electronic device; and
    outputting a notification regarding the application running on the electronic device, wherein the notification comprises the predicted time information of the application.

2. The method of claim 1, wherein the power consumption index corresponding to the specific subsystem represents a power consumption value of the specific subsystem; and the step of performing the configuration adjustment on the at least one portion of the electronic device according to the power consumption index corresponding to the specific subsystem further comprises:
    performing the configuration adjustment on the at least one portion of the electronic device according to the power consumption value of the specific subsystem.

3. The method of claim 1, wherein the power consumption index corresponding to the specific subsystem is proportional to power consumed by the specific subsystem; and the step of performing the configuration adjustment on the at least one portion of the electronic device according to the power consumption index corresponding to the specific subsystem further comprises:

determining a power consumption value of the specific subsystem according to the power consumption index corresponding to the specific subsystem; and performing the configuration adjustment on the at least one portion of the electronic device according to the power consumption value of the specific subsystem.

4. The method of claim 1, wherein the power consumption index corresponding to the specific subsystem indicates a specific status of the specific subsystem, and the specific status is a predefined status within a plurality of predefined statuses of the specific subsystem; and the step of performing the configuration adjustment on the at least one portion of the electronic device according to the power consumption index corresponding to the specific subsystem further comprises:

determining a power consumption value of the specific subsystem according to the specific status indicated by the power consumption index corresponding to the specific subsystem; and performing the configuration adjustment on the at least one portion of the electronic device according to the power consumption value of the specific subsystem.

5. The method of claim 1, further comprising:

utilizing another power consumption index generator positioned in another subsystem to generate another power consumption index corresponding to the other subsystem, wherein the other subsystem is another of the plurality of subsystems;

wherein the step of performing the configuration adjustment on the at least one portion of the electronic device according to the power consumption index corresponding to the specific subsystem further comprises:

performing the configuration adjustment on the at least one portion of the electronic device according to the power consumption index corresponding to the specific subsystem and according to the other power consumption index corresponding to the other subsystem.

6. The method of claim 1, further comprising:

generating power consumption information of an application running on the electronic device according to the power consumption index corresponding to the specific subsystem, wherein the power consumption information of the application indicates power consumed by running the application; and outputting a notification regarding the application running on the electronic device, wherein the notification comprises the power consumption information of the application.

7. The method of claim 1, wherein the step of performing the configuration adjustment on the at least one portion of the electronic device according to the power consumption index corresponding to the specific subsystem further comprises performing the configuration adjustment on the at least one portion of the electronic device according to the power consumption index corresponding to the specific subsystem, to perform proactive thermal control by controlling power consumption of the electronic device.

8. An apparatus for performing system power budgeting within an electronic device, the electronic device comprising a plurality of subsystems, the apparatus comprising:

a power consumption index generator positioned in a specific subsystem of the plurality of subsystems, capable of generating a power consumption index corresponding to the specific subsystem; and a processing circuit, coupled to the power consumption index generator, capable of performing configuration adjustment on at least one portion of the electronic device according to the power consumption index corresponding to the specific subsystem, to enhance performance of the electronic device without exceeding a power budget of the electronic device, wherein the power budget represents a predetermined total power consumption value of the electronic device; and the processing device is capable of determining a remaining power consumption value within the power budget by subtracting at least a power consumption value of the specific subsystem from the power budget wherein the power consumption value of the specific subsystem is associated to the power consumption index corresponding to the specific subsystem; the processing circuit is capable of monitoring whether one of a plurality of predicted power consumption values of the at least one portion of the electronic device is greater than the remaining power consumption value, wherein the plurality of predicted power consumption values is associated to a plurality of predetermined configurations of the electronic device, respectively; and the configuration adjustment is performed by selecting one of the plurality of predetermined configurations of the electronic device; and with aid of the processing circuit, the electronic apparatus generates predicted time information of an application running on the electronic device according to the power consumption index corresponding to the specific subsystem, wherein the predicted time information of the application indicates remaining time that the application runs on the electronic device without encountering shutdown of the electronic device; and the electronic device outputs a notification regarding the application running on the electronic device, wherein the notification comprises the predicted time information of the application.

9. The apparatus of claim 8, wherein the power consumption index corresponding to the specific subsystem; and the processing circuit is capable of performing the configuration adjustment on the at least one portion of the electronic device according to the power consumption value of the specific subsystem.

10. The apparatus of claim 8, wherein the power consumption index corresponding to the specific subsystem is proportional to power consumed by the specific subsystem; the processing circuit is capable of determining a power consumption value of the specific subsystem according to the power consumption index corresponding to the specific subsystem; and the processing circuit is capable of performing the configuration adjustment on the at least one portion of the electronic device according to the power consumption value of the specific subsystem.

11. The apparatus of claim 8, wherein the power consumption index corresponding to the specific subsystem indicates a specific status of the specific subsystem, and the specific status is a predefined status within a plurality of predefined statuses of the specific subsystem; the processing circuit is capable of determining a power consumption value of the specific subsystem according to the specific status indicated by the power consumption index corresponding to the specific subsystem; and the processing circuit is capable of performing the configuration adjustment on the at least one portion of the electronic device according to the power consumption value of the specific subsystem.

12. The apparatus of claim 8, wherein the processing circuit is capable of utilizing another power consumption index generator positioned in another subsystem to generate another power consumption index corresponding to the other subsystem, wherein the other subsystem is another of the plurality of subsystems; and the processing circuit is capable of performing the configuration adjustment on the at least one portion of the electronic device according to the power consumption index corresponding to the specific subsystem and according to the other power consumption index corresponding to the other subsystem.

13. The apparatus of claim 8, wherein with aid of the processing circuit, the electronic apparatus generates power consumption information of an application running on the electronic device according to the power consumption index corresponding to the specific subsystem, wherein the power consumption information of the application indicates power consumed by running the application; and the electronic device outputs a notification regarding the application running on the electronic device, wherein the notification comprises the power consumption information of the application.

\* \* \* \* \*